(12) United States Patent
Kanda et al.

(10) Patent No.: US 10,459,164 B2
(45) Date of Patent: Oct. 29, 2019

(54) COATING REMOVING DEVICE

(71) Applicant: FUJIKURA LTD., Tokyo (JP)

(72) Inventors: Yoshiharu Kanda, Chiba (JP);
Noriyuki Kawanishi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 131 days.

(21) Appl. No.: 15/541,298

(22) PCT Filed: Mar. 3, 2017

(86) PCT No.: PCT/JP2017/008491
§ 371 (c)(1),
(2) Date: Jun. 30, 2017

(87) PCT Pub. No.: WO2018/154792
PCT Pub. Date: Aug. 30, 2018

(65) Prior Publication Data
US 2018/0267242 A1 Sep. 20, 2018

(30) Foreign Application Priority Data
Feb. 24, 2017 (JP) .................................. 2017-033592

(51) Int. Cl.
*G02B 6/245* (2006.01)
*H02G 1/12* (2006.01)

(52) U.S. Cl.
CPC .......... *G02B 6/245* (2013.01); *H02G 1/1209* (2013.01); *H02G 1/1241* (2013.01); *H02G 1/1275* (2013.01)

(58) Field of Classification Search
CPC .... G02B 6/245; H02G 1/1209; H02G 1/1241; H02G 1/1275; H02G 1/1214; H02G 1/1224; H02G 1/1229
See application file for complete search history.

(56) References Cited

U.S. PATENT DOCUMENTS

| | | | |
|---|---|---|---|
| 6,598,497 B1 * | 7/2003 | Mizushima | G02B 6/245 81/9.41 |
| 2004/0055161 A1 | 3/2004 | Chiang et al. | |
| 2014/0151425 A1 * | 6/2014 | Hasegawa | G02B 6/25 225/96 |

FOREIGN PATENT DOCUMENTS

| | | |
|---|---|---|
| CN | 101164001 A | 4/2008 |
| CN | 101427169 A | 5/2009 |
| CN | 102692676 A | 9/2012 |
| CN | 103477256 A | 12/2013 |
| CN | 103733098 A | 4/2014 |
| CN | 104428705 A | 3/2015 |
| CN | 207232424 U | 4/2018 |
| JP | H01-090003 U | 6/1989 |

(Continued)

OTHER PUBLICATIONS

Office Action in counterpart Korean Patent Application No. 10-2017-7011932 dated Oct. 26, 2018 (8 pages).

*Primary Examiner* — Robert J Scruggs
(74) *Attorney, Agent, or Firm* — Osha Liang LLP

(57) ABSTRACT

A coating removing device includes a heating section that includes a heater to heat a coating of an optical fiber, and a blade to make an incision in the coating of the optical fiber; a gripping section that grips the optical fiber and is capable of moving with respect to the heating section; and a counter that counts a coating removal event number by detecting separation between the heating section and the gripping section.

9 Claims, 16 Drawing Sheets

(56) References Cited

FOREIGN PATENT DOCUMENTS

| | | | |
|---|---|---|---|
| JP | 2002-328241 | A | 11/2002 |
| JP | 2003-315561 | A | 11/2003 |
| JP | 2015-184647 | A | 10/2015 |
| JP | 6014074 | B2 | 10/2016 |
| KR | 100582690 | B1 | 5/2006 |
| KR | 2014-0051409 | A | 4/2014 |
| KR | 2015-0046314 | A | 4/2015 |
| WO | 2013/024723 | A1 | 2/2013 |

* cited by examiner

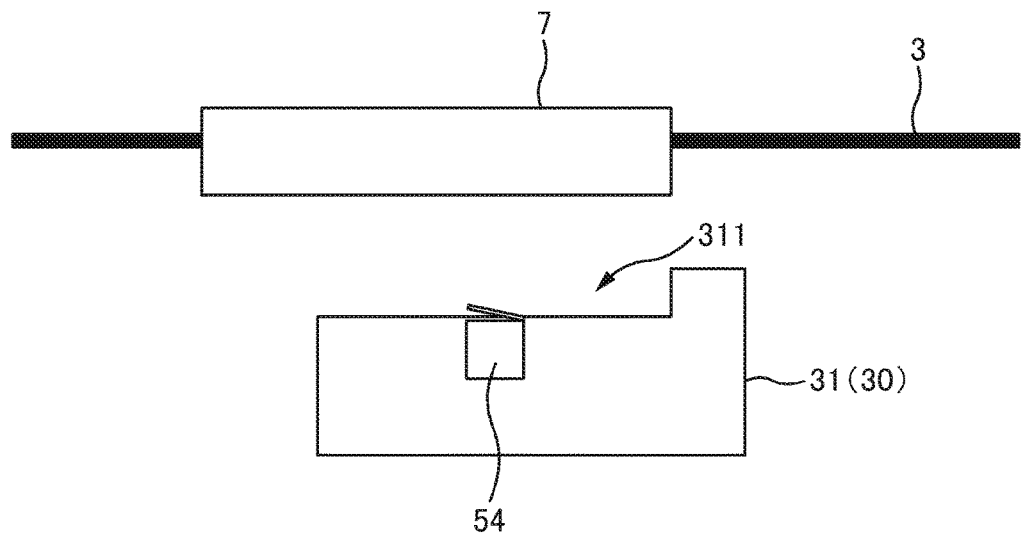
FIG. 11A (PRE-DETECTION STATE)
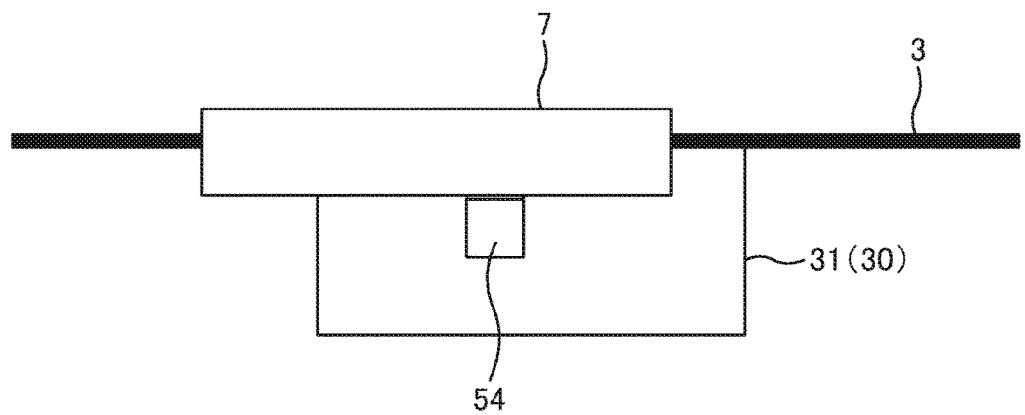
FIG. 11B (DETECTION STATE)

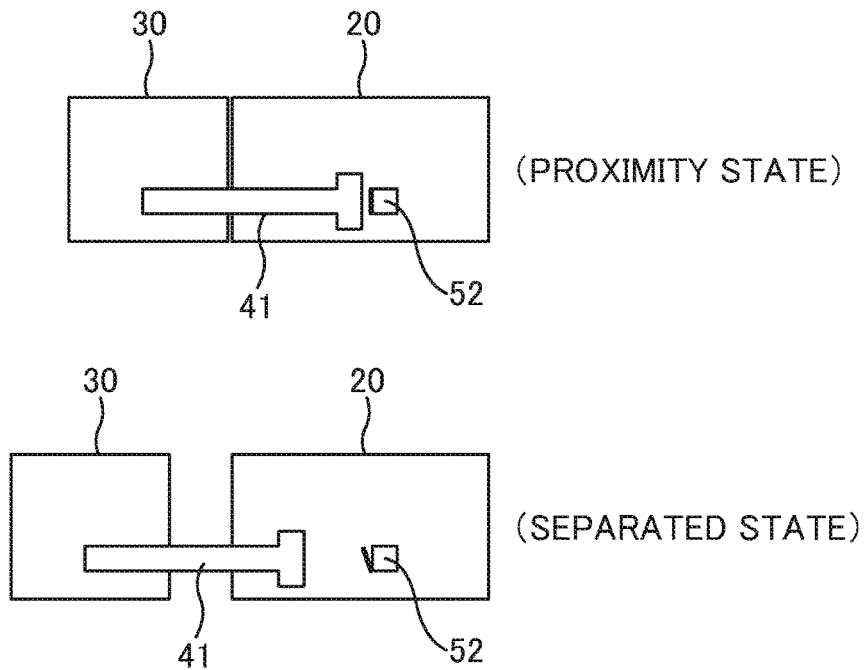
FIG. 13A (FOURTH EMBODIMENT)
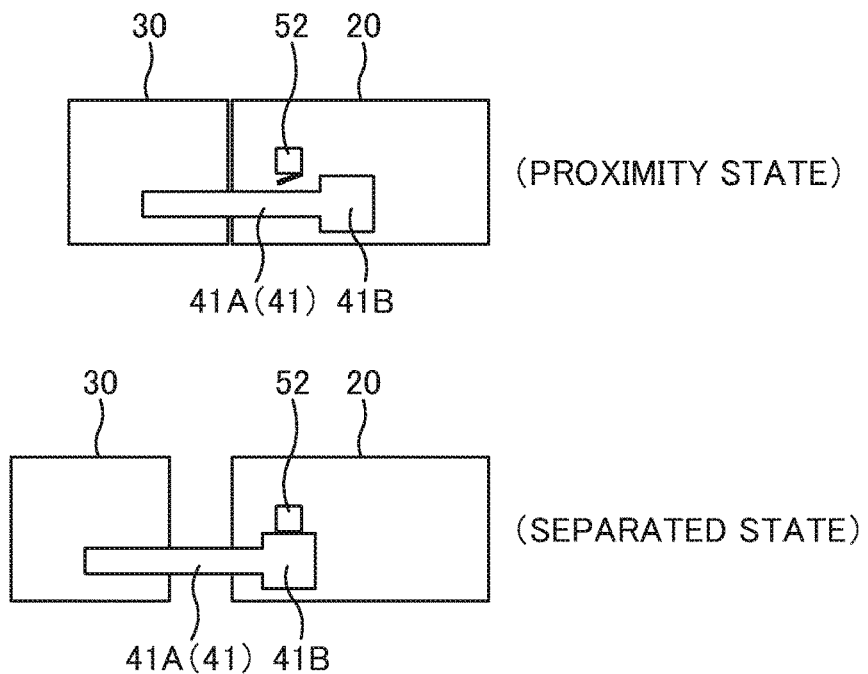
FIG. 13B (MODIFIED EXAMPLE)

COATING REMOVING DEVICE

TECHNICAL FIELD

One or more embodiments of the present invention relate to a coating removing device for an optical fiber.

BACKGROUND ART

Known examples of coating removing devices to remove a coating of an optical fiber include devices such as those described in Patent Literature 1 and 2. The coating removing devices described in Patent Literature 1 and 2 heat and soften a coating to be removed from an optical fiber, reduce adhesive force between the bare optical fiber and the coating, and remove the coating.

Patent Literature 1: Japanese Unexamined Utility Model Application Publication No. H01-90003

Patent Literature 2: Japanese Unexamined Patent Application Publication No. 2002-328241

FIG. 16A is an explanatory diagram of a manner in which coating removal is performed. A pair of blades 21A, 23A makes incisions in a coating 5 at a coating removal start position. Then, a gripping section (not illustrated described later) that grips an optical fiber 3 on the left side of FIG. 16A is moved such that the blades 21A, 23A pull off the coating 5, and the coating 5 is removed from the optical fiber 3. Since it is necessary to catch the coating 5 with the blades 21A, 23A during removal of the coating 5, a gap between the pair of blades 21A, 23A is set narrower than the thickness of the coating 5 (the diameter of the optical fiber 3), and slightly wider than the diameter of a bare optical fiber 4.

Due to the gap between the pair of blades 21A, 23A being wider than the diameter of the bare optical fiber 4, the bare optical fiber 4 moves up and down when pulling the coating 5 off, and the blades 21A, 23A may make contact with the bare optical fiber 4. The hardness of the blades 21A, 23A is accordingly set lower than the hardness of the bare optical fiber 4 so as to suppress damage to the bare optical fiber 4. As a result, the blade tips gradually wear with repeated removal of the coating 5.

If the coating 5 is removed using the worn blades 21A, 23A, an issue of not being able to completely remove the coating 5, and part of the coating 5 remaining on the bare optical fiber 4, arises. In cases in which part of the coating 5 remains on the bare optical fiber 4 and a subsequent cleaning process is not able to completely remove the coating 5, the coating 5 remaining on the surface of the bare optical fiber 4 might combust in a weld connection process, reducing the long-term reliability of the optical fiber 3.

Moreover, if, as illustrated in FIG. 16B, the coating 5 is removed in a state in which one of the blades (the lower side blade 21A in FIG. 16B) has become worn, a timing at which the worn blade 21A splits the coating 5 is delayed, and slippage occurs between the worn blade 21A and the coating 5. This results in an issue of force acting on the bare optical fiber 4 becoming unbalanced. When unbalanced force acts on the bare optical fiber 4, bending of the bare optical fiber 4 or excessive pressing of the bare optical fiber 4 against the upper blade 23A might occur, reducing the long-term reliability of the optical fiber 3.

In order to prevent issues such as those described above, it is desirable to replace the blades when the blades become worn. However, due to the difficulty in assessing the amount of wear of the blades by sight, it is easy to perform coating removal without noticing that the blades are due for replacement.

SUMMARY

One or more embodiments of the present invention prompt blade replacement when a blade has become worn.

Some embodiments of the present invention are a coating removing device including: a heating section that includes a heater to heat a coating of an optical fiber, and a blade to make an incision in the coating of the optical fiber; a gripping section that grips the optical fiber and is capable of moving with respect to the heating section; and a counter that counts the number of times of coating removal (a "coating removal event number") by detecting separation between the heating section and the gripping section.

Other features of one or more embodiments of the present invention are made clear by the Description and Drawings below.

Advantageous Effects

Some embodiments of the present invention enable blade replacement to be prompted when a blade has become worn.

BRIEF DESCRIPTION OF DRAWINGS

FIG. 11A and FIG. 11B are explanatory diagrams of a holder detector 54.

FIG. 13A is an explanatory diagram of a separation detector 52 of a fourth embodiment. FIG. 13B is an explanatory diagram of a separation detector 52 of a modified example of the fourth embodiment.

DETAILED DESCRIPTION

Figure 1:
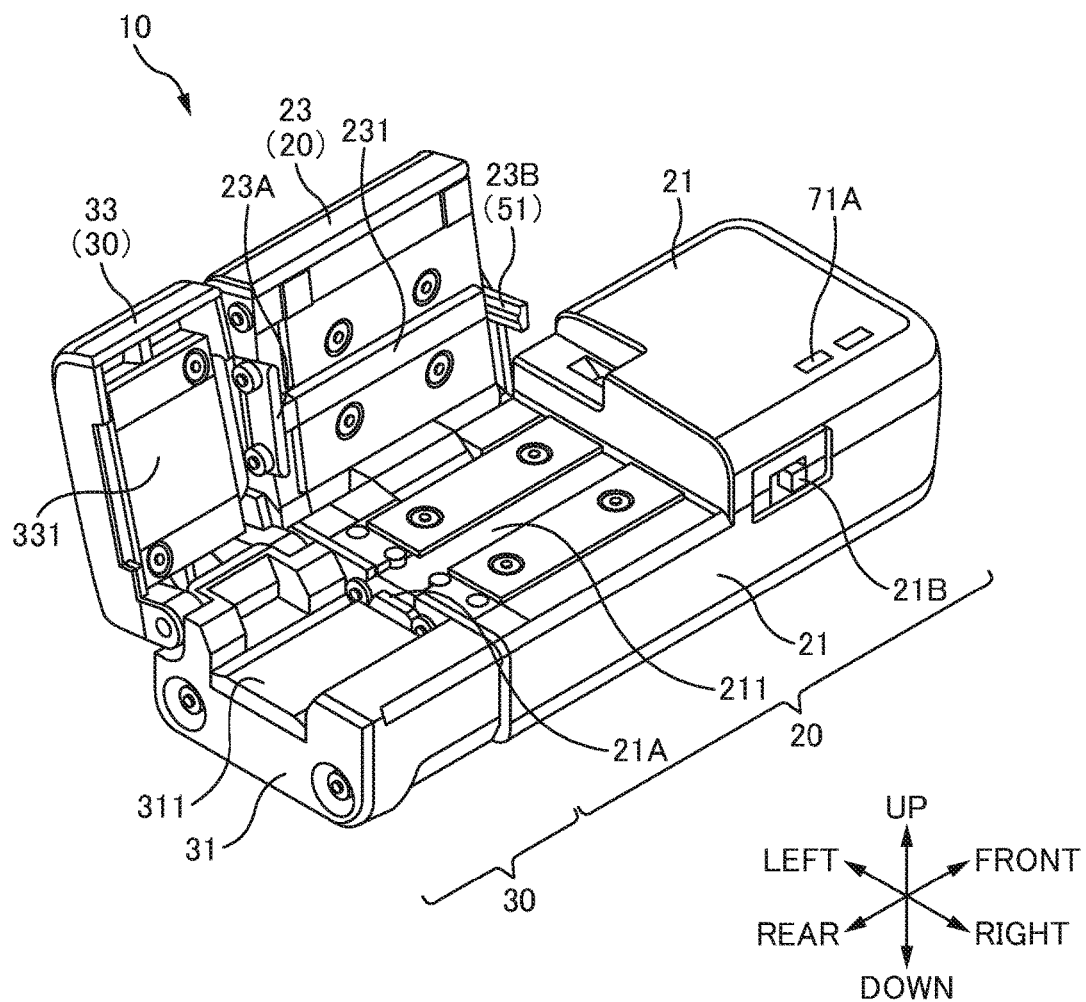
FIG. 1 is an overall perspective view of a coating removing device 10 of an embodiment.

At least the following matters are made clear from the Description and Drawings described below.

Disclosed is a coating removing device including: a heating section that includes a heater to heat a coating of an optical fiber, and a blade to make an incision in the coating of the optical fiber; a gripping section that grips the optical fiber and is capable of moving with respect to the heating section; and a counter that counts the number of times of coating removal (a "coating removal event number") by detecting separation between the heating section and the gripping section. Such a coating removing device is able to count the coating removal event number and is able to prompt blade replacement when a blade has become worn.

In one embodiment, the counter counts the coating removal event number when a closed state of a lid of the heating section has been detected and separation between the heating section and the gripping section has been detected. This enables the count precision of the coating removal event number to be raised due to not counting the coating removal event number when the lid is in an open state, even when separation between the heating section and the gripping section is detected.

In one embodiment, after the counter has counted the coating removal event number, the counter permits the next counting of the coating removal event number when an open state of the lid of the heating section has been detected. This thereby enables the count precision of the coating removal event number to be raised.

In one embodiment, the counter counts the coating removal event number when heating by the heater of the heating section has been detected and separation between the heating section and the gripping section has been detected. This thereby enables the count precision of the coating removal event number to be raised due to the coating removal event number not being counted when the heating section is not being heated, even when separation between the heating section and the gripping section is detected.

In one embodiment, the gripping section includes a holder housing part that houses a holder retaining the optical fiber; and the counter counts the coating removal event number when the holder has been detected as being housed in the holder housing part and separation between the heating section and the gripping section has been detected. This thereby enables the count precision of the coating removal event number to be raised due to the coating removal event number not being counted when the holder is not housed in the holder housing part, even when separation between the heating section and the gripping section is detected.

In one embodiment, a shaft connects the heating section and the gripping section together and guides separation between the heating section and the gripping section, and separation between the heating section and the gripping section is detected by detecting that a movement amount of the shaft has reached a predetermined amount when the heating section and the gripping section have been separated. This thereby enables the count precision of the coating removal event number to be raised due to the coating removal event number not being counted as long as the heating section and the gripping section have not been separated by a predetermined amount or greater.

In one embodiment, a proximity-retention section maintains the heating section and the gripping section in a state in which they have been brought into proximity to each other. This thereby enables the count precision of the coating removal event number to be raised due to being able to suppress separation of the heating section and the gripping section when the coating is not being removed.

In one embodiment, the proximity-retention section uses magnetic force to maintain the heating section and the gripping section in the state in which they have been brought into proximity to each other; and the magnetic force of the proximity-retention section is used to detect separation between the heating section and the gripping section. This thereby enables a reduction in the number of components.

In one embodiment, a notification section notifies that the coating removal event number has reached a predetermined value. This thereby enables an operator to be prompted to replace the blade.

In one embodiment, a display section displays the coating removal event number. This thereby enables an operator to be prompted to replace the blade.

First Embodiment

<Basic Configuration of Coating Removing Device 10>

Figure 2A:
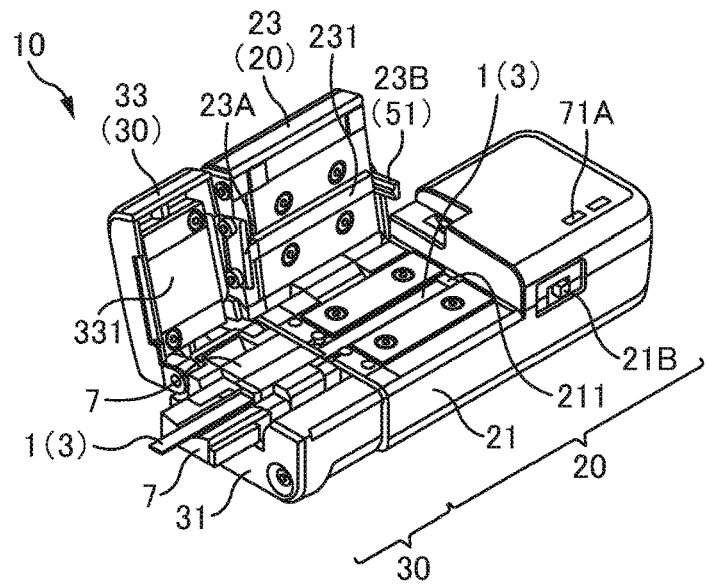
FIG. 2A to FIG. 2C are explanatory diagrams illustrating how coating removal is performed.
Figure 2B:
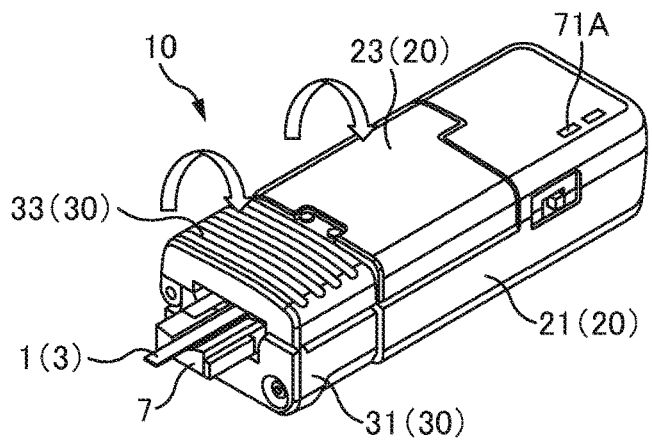
Figure 2C:
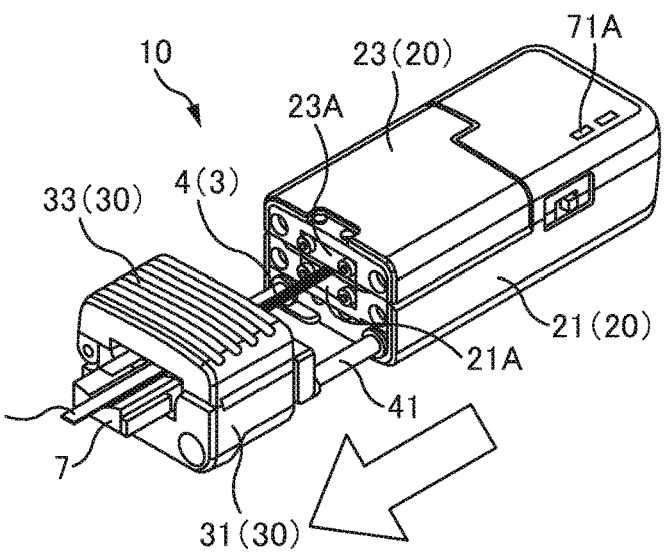

FIG. 1 is an overall perspective view of a coating removing device 10 of the present embodiment. FIG. 2A to FIG. 2C are explanatory diagrams illustrating how coating removal is performed.

Figure 16A:
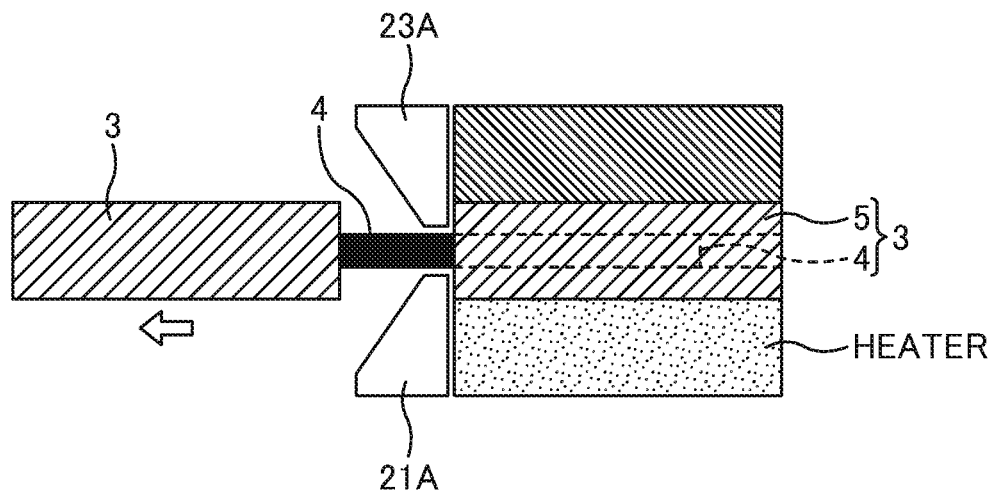
FIG. 16A is an explanatory diagram illustrating how coating removal is performed.
Figure 16B:
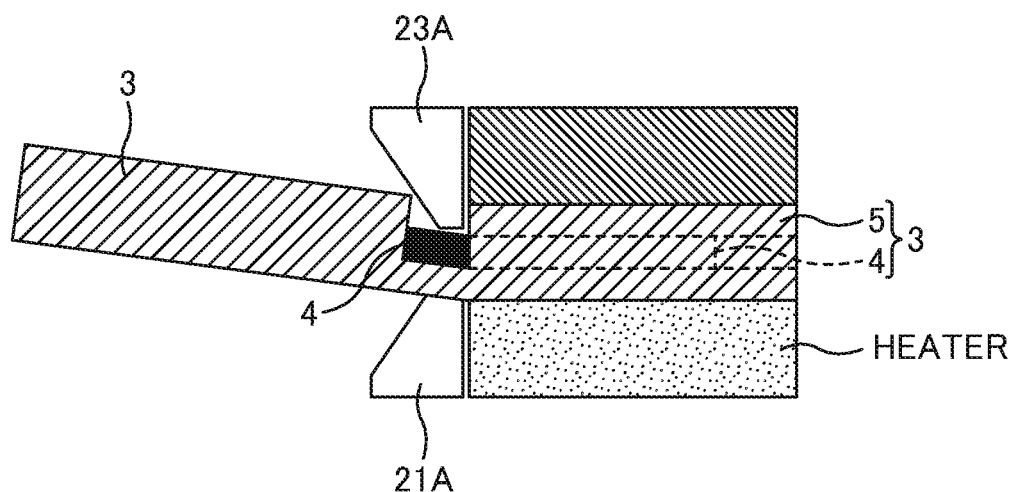
FIG. 16B is an explanatory diagram illustrating how coating removal is performed when a blade has become worn.

The coating removing device 10 is a device that removes a coating from an optical fiber. The target of coating removal in this case is an optical fiber ribbon 1 including a plurality of optical fibers 3; however, application may be made to a single-core optical fiber. The coating removing device 10 of the present embodiment is a device that heats and softens a coating material 5 (referred to below simply as the coating) that covers an outer periphery of a bare optical fiber 4 (see FIG. 16A), reduces adhesive force between the bare optical fiber 4 and the coating, and removes the coating. The coating removing device 10 of the present embodiment is also referred to as a hot jacket stripper.

In the following explanation sometimes reference is made to the directions illustrated in FIG. 1. Namely, a movement direction of a body section and a gripping section 30 is taken as a front-to-rear direction, with the side of the body section at the "front" and the side of the gripping section 30 at the "rear". Note that the front-to-rear direction is also sometimes referred to as the "separation direction", the "approach direction", or the "slide direction". A direction perpendicular to a bottom face of a holder housing part 311 of the gripping section 30 is taken as an "up-and-down direction". As viewed from the bottom face of the holder housing part 311, the side where a holder 7 is housed is "up", and the opposite side thereto (the side of a gripping-side body 31) is "down". Moreover, a direction perpendicular to the front-to-rear direction and to the up-and-down direction is taken as a "left-to-right direction". As viewed from the rear side, the right side is "right", and the left side is "left" (in this case the hinge sides of lids (a heating-side lid 23 and a gripping side lid 33) are on the "left", and the opening and closing sides thereof are on the "right").

The coating removing device 10 includes a heating section 20 and the gripping section 30.

The heating section 20 is a member that heats the coating of the optical fiber. The heating section 20 includes a pair of blades 21A, 23A to remove the coating. The heating section 20 includes a heating-side body 21 and a heating-side lid 23. The blades are provided on the heating-side body 21 and the heating-side lid 23, respectively.

The heating-side body 21 is a member configuring a body of the heating section 20. The heating-side body 21 includes the blade 21A and a heater 211. The blade 21A is a member that makes an incision in the coating, and catches the coating so as to remove the coating. The heater 211 is a heat source to heat the coating of the optical fiber. The heater 211 also functions of as a placement section on which to place an end portion of the optical fiber. Specifically, the heater 211 is formed with a groove shape along the front-to-rear direction so as to enable placement thereon or the end portion of the optical fiber in a state in which the end portion of the optical fiber is guided in the front-to-rear direction. The heating-side body 21 is provided with a power switch 21B, and an LED lamp 71A (an output section 71) and the like.

The heating-side lid 23 is a lid member capable of opening and closing with respect to the heating-side body 21. The heating-side lid 23 includes the blade 23a and a retention part 231. The retention part 231 sandwiches the end portion of the optical fiber between itself and the heater 211 of the heating-side body 21, and is a location to retain the end portion of the optical fiber. When the heating-side lid 23 is closed, the end portion of the optical fiber is pressed against the heater 211 so as to be heated by the heater 211. Note that a heat source (heater 211) to heat the coating of the optical fiber may also be provided to the heating-side lid 23.

The gripping section 30 is a member that grips the optical fiber. In the present embodiment, the gripping section 30 grips the optical fiber by gripping the holder 7 retaining the optical fiber. However, configuration may be made such that the gripping section 30 grips the optical fiber indirectly through a member other than the holder 7, or grips the optical fiber directly. The gripping section 30 is configured so as to be capable of moving in the front-to-rear direction with respect to the heating section 20 (see FIG. 2C). The gripping section 30 includes the gripping-side body 31 and the gripping-side lid 33.

The gripping-side body 31 is a member configuring a body of the gripping section 30. The gripping-side body 31 includes the holder housing part 311. The holder housing part 311 is allocation to house the holder 7 retaining the optical fiber.

The gripping-side lid 33 is a lid member capable of opening and closing with respect to the gripping-side body 31. The gripping-side lid 33 includes a holder retention part 331. The holder retention part 331 sandwiches the holder 7 retaining the optical fiber between itself and the gripping-side body 31, and is a location to grip the holder 7. When the gripping-side lid 33 is closed, the holder 7 is pressed against the holder housing part 311, such that the holder 7 is gripped between the gripping-side body 31 and the gripping-side lid 33.

The heating section 20 and the gripping section 30 are connected together by a shaft 41 (see FIG. 2C). The shaft 41 is a member that connects the heating section 20 and the gripping section 30 together, and also guides relative movement between the heating section 20 and the gripping section 30. In the present embodiment, one end of the shaft 41 is fixed to the gripping section 30. When the gripping section 30 moves with respect to the heating section 20, the shaft 41 also moves with respect to the heating section 20. However, the shaft 41 may be fixed on the heating section 20 side.

In order to remove coating of she optical fiber, an operator first switches on the power switch 21B of the coating removing device 10. The operator then opens the heating-side lid 23 and the gripping-side lid 33, as illustrated in FIG. 2A, houses the holder 7 retaining the optical fiber 3 (the optical fiber ribbon 1 in this case) in the holder housing part 311 of the gripping section 30, and places the end portion of the optical fiber 3 on the heater 211 of the heating-side body 21. The optical fiber 3 is thereby set in the coating removing device 10.

Next, as illustrated in FIG. 2B, the operator closes the heating-side lid 23 and the gripping-side lid 33. Incisions are made in the coating of the optical fiber 3 by the pair of blades 21A, 23A when the heating-side lid 23 is closed. Moreover, when the heating-side lid 23 is closed, the end portion of the optical fiber 3 is sandwiched between the heater 211 of the heating side body 21 and the retention part 231 of the heating-side lid 23, and the coating on the end portion of the optical fiber 3 is heated by the heater 211. Note that, as described later, heating by the heater 211 starts when a lid detector 51 has detected that the heating-side lid 23 is in a closed state. When the coating on the end portion of the optical fiber 3 is heated, the coating softens, reducing the adhesive force between the bare optical fiber 4 and the coating to achieve a state in which the coating is easy to remove.

Next, as illustrated in FIG. 2C, the operator moves the gripping section 30 rearward with respect to the heating section 20 in a state in which the heating-side lid 23 and the gripping-side lid 33 are closed. The heating section 20 and the gripping section 30 are thereby separated from each other. The coating on the end portion of the optical fiber is thus pulled off by the pair of blades 21A, 23A (see FIG. 16A), and the coating of the optical fiber is removed.

Figure 3:
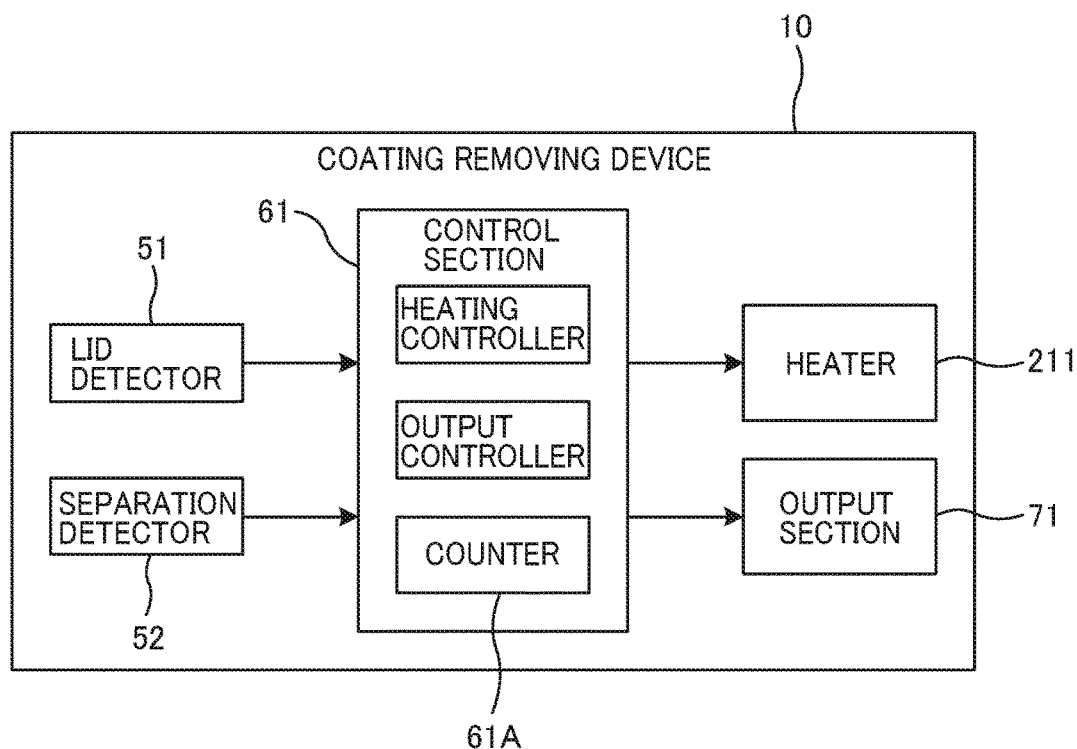
FIG. 3 is a block diagram illustrating a configuration of the coating removing device 10.

FIG. 3 is a block diagram illustrating a configuration of the coating removing device 10. The coating removing device 10 includes a control section 61, various detectors (such as the lid detector 51), and the output section 71 (such as the LED lamp 71A).

The control section 61 has a function or overseeing control of the coating removing device 10. The control section 61 is, for example, configured from an arithmetic processing unit and a storage device, and various processing is implemented by the arithmetic processing unit executing a program stored in the storage device. Detection results from the various detectors are input to the control section 61. The control section 61 controls the heater 211 and the output section 71 based on the detection results of the various detectors.

The lid detector 51 is a member that detects opening and closing of the heating-side lid 23. The lid detector 51 includes a projecting tab 23B (see FIG. 1) provided on the heating-side lid 23. The lid detector 51 detects that the heating-side lid 23 has been closed (is in a closed state) by a detection part, such as a switch or sensor (not illustrated in FIG. 1: see FIG. 4A to FIG. 4C), of the heating-side body 21 detecting the projecting tab 23B when the heating-side lid 23 has been closed.

Figure 4A:
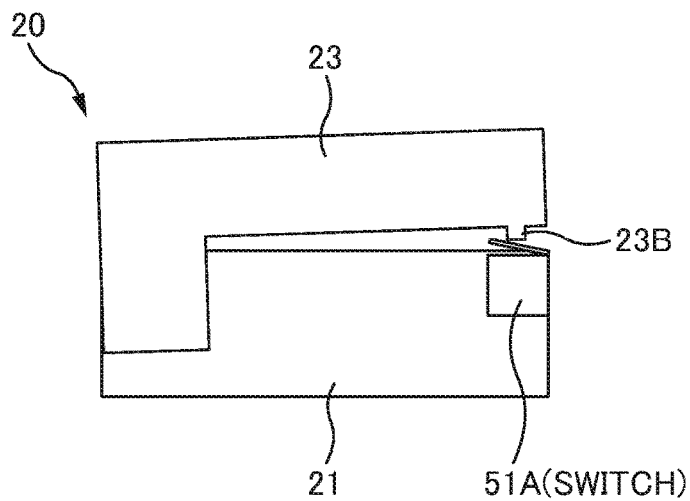
FIG. 4A to FIG. 4C are explanatory diagrams of examples of configurations of a lid detector 51.
Figure 4B:
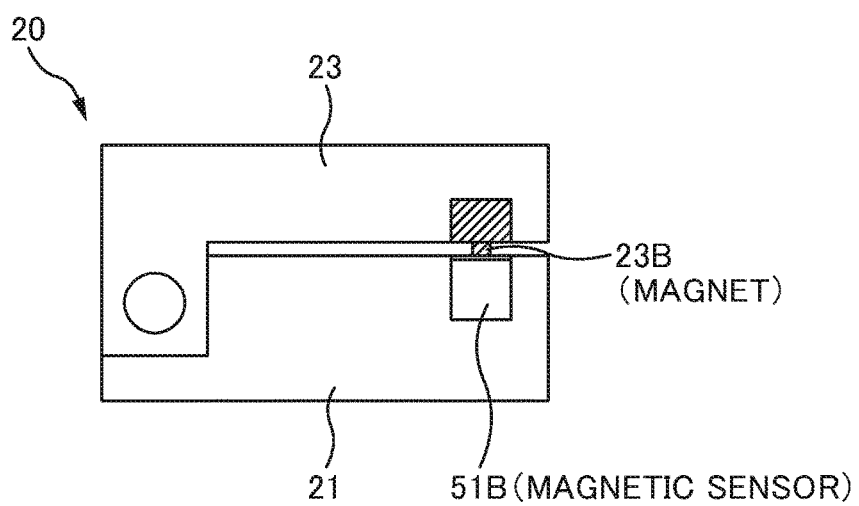
Figure 4C:
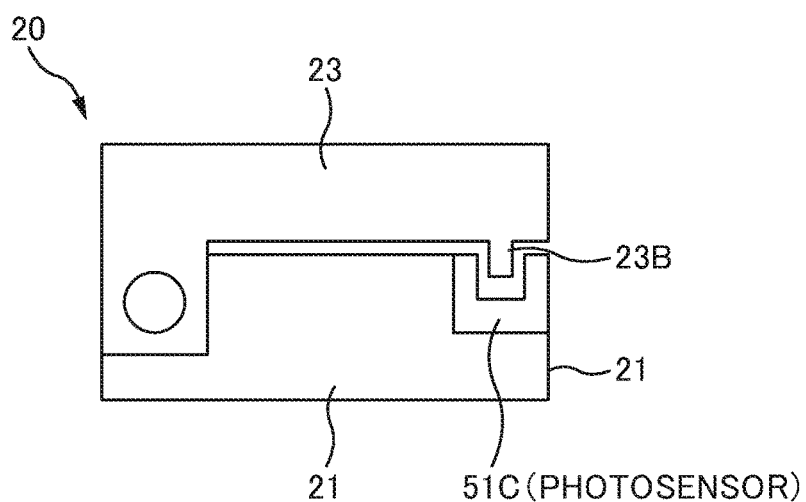

FIG. 4A to FIG. 4C are explanatory diagrams of examples of configurations of the lid detector 51 (51A to 51C). The lid detector 51A illustrated in FIG. 4A detects the closed state (and the open state) of the heating-side lid 23 by the projecting tab 23B of the heating side lid 23 (see FIG. 1) switching a switch (detection part) of the heating-side body 21 ON or OFF according to opening or closing of the heating-side lid 23. In the lid detector 51B illustrated in FIG. 4B, a magnetic sensor (detection part) is provided on the heating-side body 21, and a magnet is provided on the projecting tab 23B of the heating-side lid 23. The closed state (and the open state) of the heating-side lid 23 is detected from magnetic changes detected by the magnetic sensor (detection part) according to opening and closing of the heating-side lid 23. The lid detector 51C illustrated in FIG. 4C detects the closed state (and the open state) of the heating-side lid 23 by the projecting tab 23B of the heating-side lid 23 (see FIG. 1) blocking detection light to a photosensor (detection part) of the heating-side body 21 according to opening and closing of the heating-side lid 23. Note that the lid detector 51 is not limited to the above configurations as long as the closed state (or the open state) of the heating-side lid 23 can be detected.

The detection result of the lid detector 51 is output to the control section 61. The control section 61 starts hewing by the heater 211 when the heating-side lid 23 has been detected to be in the closed state based on the detection result of the lid detector 51. Accordingly, heating of the heater 211 is started automatically when the operator has closed the heating-side lid 23 as illustrated in FIG. 2B. Moreover, the control section 61 stops heating by the heater 211 when the heating-side lid 23 has been detected to be in the open state based on the detection result of the lid detector 51. Accordingly, the heating by the heater 211 is stopped automatically when the operator has opened the heating-side lid 23 and the gripping-side lid 33 to take out the optical fiber after removing the coating. The control section 61 thus serves as a heating controller that controls the heater 211.

Moreover, the control section 61 illuminates the LED lamp 71A (the output section 71) after a predetermined time has elapsed from when the heating-side lid 23 was detected to be in the closed state based on the detection result of the lid detector 51. This enables the operator to be informed that the coating on the end portion of the optical fiber has been heated, and enables the operator to be prompted to perform the moving operation of the gripping section 30 illustrated in FIG. 2C. The control section 61 thus serves as an output controller that controls the output section 71.

The coating removing device 10 includes, as the output section 71, a display section such as the LED lamp 71A, a speaker (not illustrated) that outputs sound, or the like. The LED lamp 71A or the speaker (not illustrated) serve as a notification section to notify that the number of times of coating removal ("coating removal event number") has reached a predetermined value, as described later.

The coating removing device 10 may include, as the output section 71, a display section capable of displaying numerical values (for example a count value, described later). A display section (the output section 71) capable of displaying a count value may be a small liquid crystal monitor also capable of displaying information other than numerical values, a segment display device with a primary purpose of displaying numerical values, or the like. The coating removing device 10 may also include, as the output section 71, a communication section that exchanges data (data including a count value, described later) with an external device.

<Coating Removal Event Number Count>

In the present embodiment, the number of times of coating removal ("coating removal event number") is counted to prompt replacement of the blades 21A, 23A when the blades 21A, 23A have become worn. As described next, the coating removal event number is counted by detecting separation of the heating section 20 and the gripping section 30.

Figure 5A:
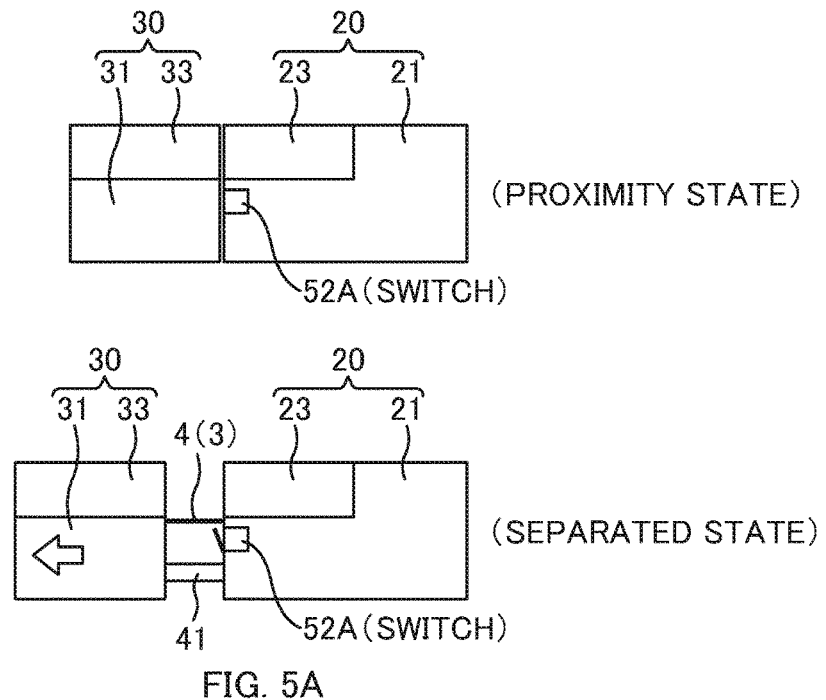
FIG. 5A to FIG. 5C are explanatory diagrams of examples of configurations of a separation detector 52.
Figure 5B:
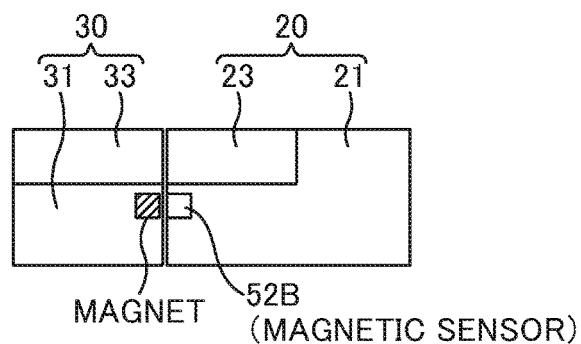
Figure 5C:
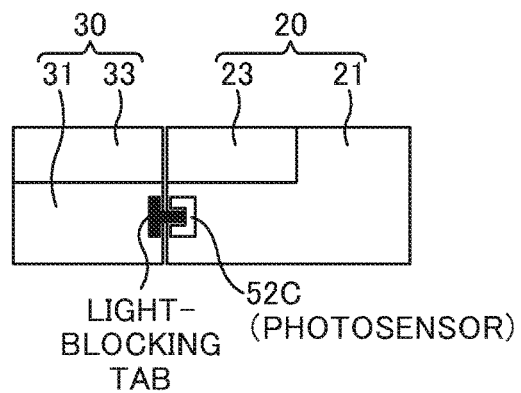

Separation Detector 52:

The coating removing device 10 includes a separation detector 52 to detect separation of the heating section 20 and the gripping section 30 (see FIG. 3). FIG. 5A to FIG. 5C are explanatory diagrams illustrating example configurations of the separation detector 52 (52A to 52C).

The separation detector 52A illustrated in FIG. 5A is configured by a mechanical switch. The diagram at the top of FIG. 5A is an explanatory diagram illustrating a state (proximity state) prior to the separation detector 52A detecting separation of the heating section 20 and the gripping section 30. The diagram at the bottom of FIG. 5A is an explanatory diagram illustrating a state (separated state) in which separation of the heating section 20 and the gripping section 30 has detected by the separation detector 52A. The separation detector 52A illustrated in FIG. 5A detects the separated state (or the proximity state) of the heating section 20 and the gripping section 30 by the switch (detection part) of the heating-side body 21 being switched ON or OFF according to proximity/separation of the heating section 20 and the gripping section 30. The separation detector 52A is disposed on a face where the heating section 20 and the gripping section 30 oppose each other. In this case, the switch configuring the separation detector 52A is disposed on the heating section 20, and the switch is switched ON or OFF by the proximity/separation of the opposing face (detected part) of the gripping section 30 to the switch. Note that the switch configuring the separation detector 52A may also be disposed on the gripping section 30 side.

The separation detector 52B illustrated in FIG. 5B is configured by a magnetic sensor. The magnetic sensor (detection part) is provided on the heating-side body 21, and a magnet (detected part) is provided on the gripping section 30. The separation detector 52A illustrated in FIG. 5B detects the separated state (or the proximity state) of the heating section 20 and the gripping section 30 using magnetic changes detected by the magnetic sensor (detection part) according to the proximity/separation of the heating section 20 and the gripping section 30.

The separation detector 52C illustrated in FIG. 5C is configured by a photosensor. The photosensor (detection part) is provided on the heating-side body 21, and a light-blocking tab (detected part) is provided on the gripping section 30. The separation detector 52C detects the separated state (or the proximity state) of the heating section 20 and the gripping section 30 by the light-blocking tab blocking/projecting detection light of the photosensor (detection part) according to the proximity/separation of the heating section 20 and the gripping section 30.

It is sufficient as long as the separation detector 52 is able to detect the separated state (or the proximity state) of the heating section 20 and the gripping section 30. Accordingly, the separation detector 52 is not limited to the configurations illustrated in FIG. 5A to FIG. 5C.

Counter 61A

The coating removing device 10 includes a counter 61A to count the coating removal event number (see FIG. 3). In the present embodiment, the counter 61A is configured by the control section 61; however, the counter 61A may be configured by a mechanical counter.

Figure 6:
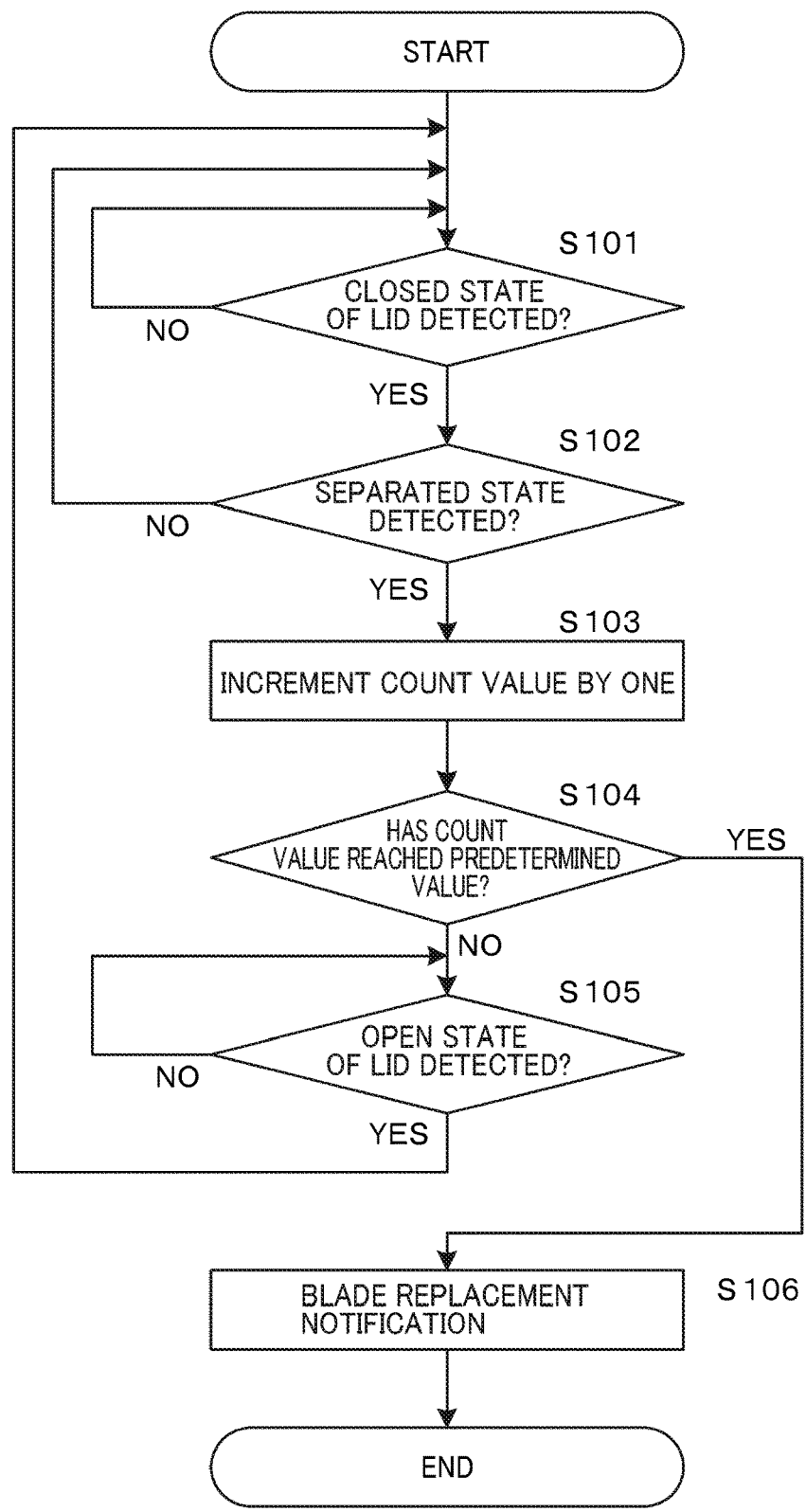
FIG. 6 is an explanatory diagram of processing to count a coating removal event number in a first embodiment.

FIG. 6 is an explanatory diagram illustrating processing to count the coating removal event number in the first embodiment.

In the first embodiment, the counter 61A determines whether or not a closed state of the heating-side lid 23 is being detected based on the detection result of the lid detector 51 (S101). As long as the closed state of the heating-side lid 23 is not being detected (S101: NO), the counter 61A repeats the determination processing of the S101 until the closed state of the heating-side lid 23 has been detected. When the closed state of the heating-side lid 23 has been detected (S101: YES), the counter 61A then determines whether or not the separated state of the heating section 20 and the gripping section 30 is being detected based on the detection result of the separation detector 52 (S102). As long as the counter 61A is not detecting the separated state of the heating section 20 and the gripping section 30 based on the detection result of the separation detector 52 (S102: NO), processing returns to the determination processing of S101. When the separated state of the heating section 20 and the gripping section 30 has been detected based on the detection result of the separation detector 52 (S102: YES), the counter 61A increments the count value of the coating removal event number by one (S103).

Namely, in the first embodiment, the counter 61A increments the count value of the coating removal event number by one (S103) when the closed state of the heating-side lid 23 has been detected based on the detection result of the lid detector 51 (S101: YES), and the separated state of the heating section 20 and the gripping section 30 has been detected based on the detection result of the separation detector 52 (S102: YES). Accordingly, the count value indicating the coating removal event number can be increased by one when, as illustrated in FIG. 2C, an operator has moved the gripping section 30 rearward with respect to the heating section 20 and separated the heating section 20 and the gripping section 30 (when the coating on the end portion of the optical fiber has been removed) in a state in which the heating-side lid 23 and the gripping-side lid 33 have been closed. Note that in the present embodiment, the counter 61A stores the count value in the storage device.

As a condition for incrementing the count value, not only is detection of the separated state of the heating section 20 and the gripping section 30 (S102) employed, but also detection of the closed state of the heating-side lid 23 (S101) is employed. Accordingly, when the heating-side lid 23 is in the "open state", the count value is not incremented even if a separated state between the heating section 20 and the gripping section 30 is detected. This is because when the heating section 20 and the gripping section 30 are separated to remove the coating, as illustrated in FIG. 2C, the operator has placed the heating-side lid 23 and the gripping-side lid 33 in the closed state. By, as in the present embodiment, employing detection of the closed state of the heating-side lid 23 (S101) as a condition for incrementing the count value, an increase in the count value can be suppressed from occurring when the coating is not being removed, thereby enabling the count precision of the coating removal event number (the precision of matching between the coating removal event number and the count value) to be raised.

In the present embodiment, the counter 61A permits the next counting of the coating removal event number (S101 to S103) when the open state of the heating-side lid 23 has been detected (S105: YES) subsequent to incrementing the count value by one (S103). In other words, in the present embodiment, after the count value has been incremented by one (S103), the coating removal event number is not next counted until after the open state of the heating-side lid 23 is detected (S105: YES). This is because after the coating on the end portion of the optical fiber has been removed, as illustrated in FIG. 2C, it is necessary to open the heating-side lid 23 (and the gripping-side lid 33) to take out the optical fiber from which the coating has been removed in order to remove the coating from the next optical fiber end portion. Moreover, after the coating on the end portion of the optical fiber has been removed, as illustrated in FIG. 2S, were the coating removal event number to be counted again without the heating-side lid 23 (and the gripping-side lid 33) being opened, there would be a high possibility that the coating removal event number would be falsely detected. However, as in the present embodiment, due to the counter 61A permitting the next counting of the coating removal event number when the open state of the heating-side lid 23 has been detected after the coating removal event number has been counted (i.e. due to not permitting the next counting of the coating removal event number when the open state of the heating-side lid 23 is not detected), the count precision of the coating removal event number (the of matching between the coating removal event number and the count value) can be raised. However, configuration may be made such that the next counting of the coating removal event number is permitted regardless of whether or not the open state of the heating-side lid 23 has been detected.

In the present embodiment, when the count value has reached a predetermined value (S104: YES), the control section 61 notifies the output section 71 that the coating removal event number has reached the predetermined value. Specifically, when the count value has reached the predetermined value (S104: YES), the control section 61 illuminates the LED lamp 71A configuring the output section 71, and thereby notifies the operator that the coating removal event number has reached the predetermined value (S106). The operator can thus be prompted to replace the blades 21A, 23A when the blades 21A, 23A have become worn. Note that the notification method of the output section 71 is not limited to illumination of the LED lamp 71A. For example, when the count value has reached the predetermined value (S104: YES), the control section 61 may sound a buzzer using a speaker configuring the output section 71, thereby notifying the operator that the coating removal event number has reached the predetermined value.

The control section 61 may display the count value of the coating removal event number on the display section (output section 71). The count value display is not limited to an electronic display, and may be a mechanical (such as a dial) display. To display the count value, the control section 61 may determine whether or not the count value has reached the predetermined value (S104) without using the output section 71 for notification (S106).

Second Embodiment

In the embodiment described above, the counter 61A increments the count value of the coating removal event number by one (S103) when the closed state of the heating-side lid 23 has been detected based on the detection result of the lid detector 51 (S101: YES), and the separated state of the heating section 20 and the gripping section 30 has been detected based on the detection result of the separation detector 52 (S102: YES). However, as a condition for incrementing the count value, detection of heating by the heater 211 may be employed instead of detection of the closed state of the heating-side lid 23 (S101).

Figure 7:
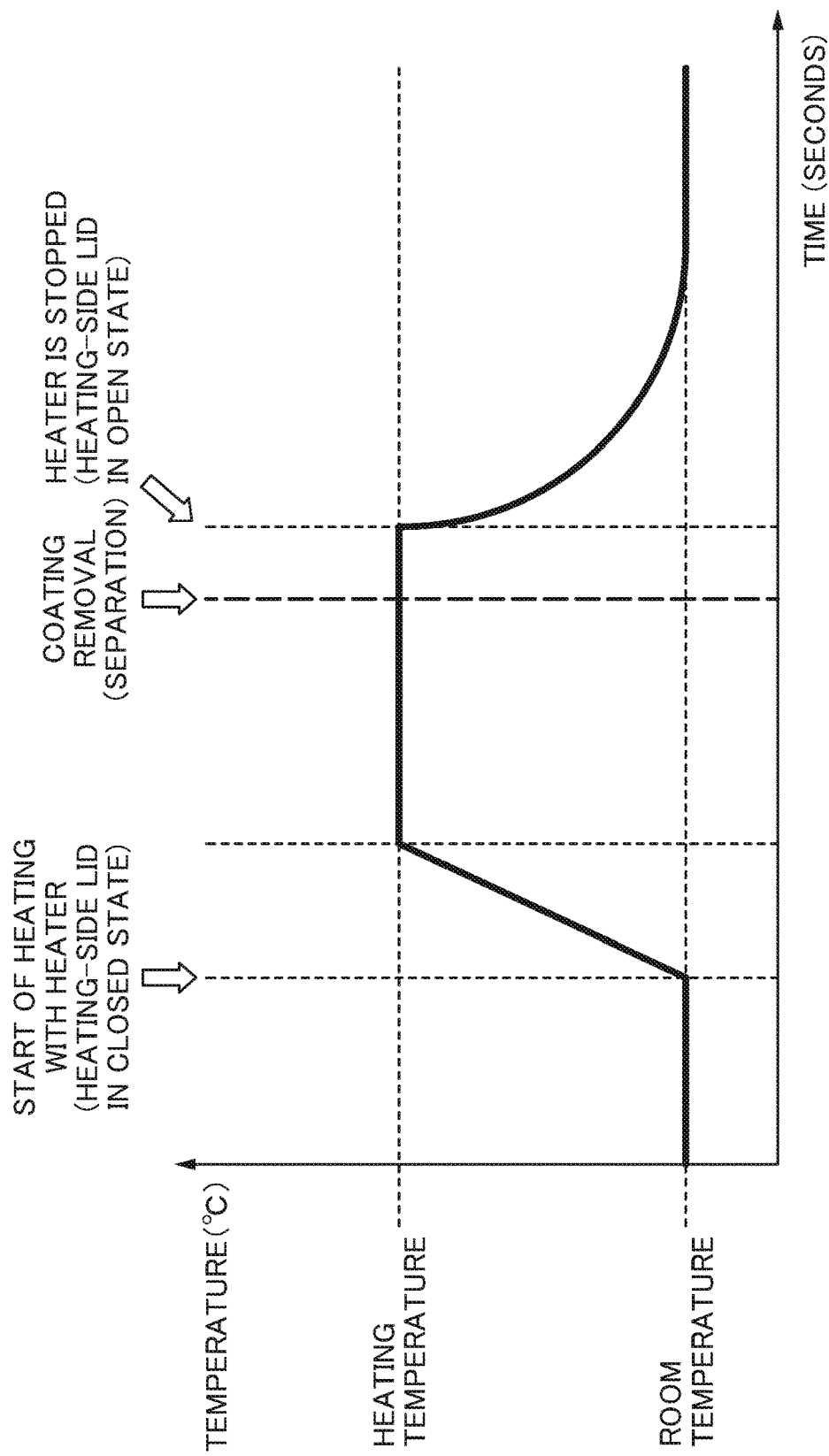
FIG. 7 is an explanatory diagram illustrating a heating profile of a heater 211.

FIG. 7 is an explanatory diagram of a heating profile of the heater 211. The horizontal axis of the graph in FIG. 7 indicates time, and the vertical axis indicates the temperature of the heater 211.

The control section 61 (heating controller) starts heating by the heater 211 when the closed state of the heating side lid 23 has been detected based on the detection result of the lid detector 51. The temperature of the heater 211 rises when heating by the heater 211 is started, and reaches a predetermined heating temperature. The control section 61 performs constant temperature control on the heater 211 so as to sustain the predetermined heating temperature, and stops heating by the heater 211 when the open state of the heating-side lid 23 has been detected.

Figure 8:
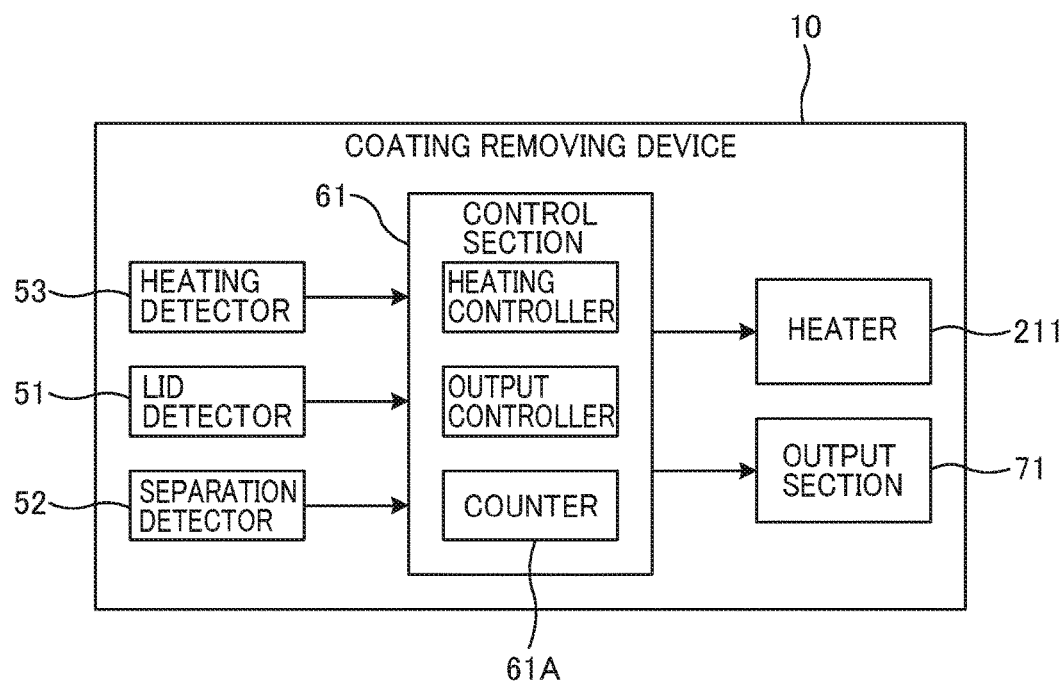
FIG. 8 is a block diagram illustrating a configuration of a coating removing device 10 of a second embodiment.

FIG. 8 is a block diagram illustrating a configuration of the coating removing device 10 of the second embodiment. The coating removing device 10 of the second embodiment includes a heating detector 53.

The heating detector 53 is a member that detects heating by the heater 211. For example, the heating detector 53 may be a temperature sensor that detects heating by the heater 211 based on a detected temperature. In such cases, a detection result of the temperature sensor of the heating detector 53 may be employed in the constant temperature control (see FIG. 7) of the heater 211. The heating detector 53 may also detect heating by the heater 211 by detecting electrical conduction to the heater 211.

Figure 9:
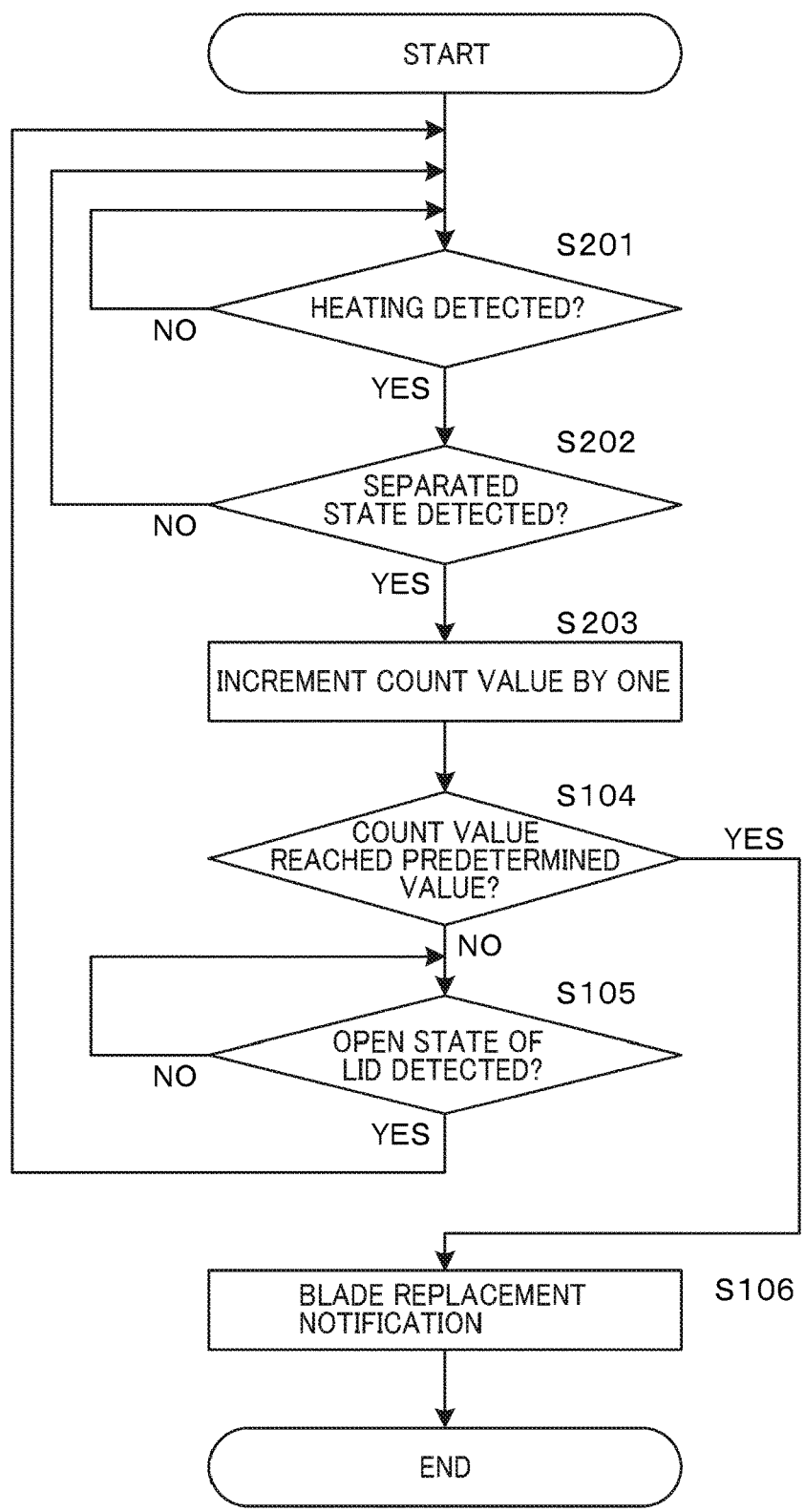
FIG. 9 is an explanatory diagram illustrating processing to count the coating removal event number in the second embodiment.

FIG. 9 is an explanatory diagram of processing to count the coating removal event number in the second embodiment.

In the second embodiment, the counter 61A determines whether or not heating by the heater 211 has been detected based on the detection result of the heating detector 53 (S201). As long as heating by the heater 211 is not being detected (S201: NO), the counter 61A repeats the determination processing of S201 until heating by the heater 211 is detected. When heating by the heater 211 has been detected (S201: YES), the counter 61A then determines whether or not the separated state of the heating section 20 and the gripping section 30 has been detected based on the detection result of the separation detector 52 (S202). As long as the separated state of the heating section 20 and the gripping section 30 is not being detected based on the detection result of the separation detector 52 (S202: NO), the counter 61A returns to the determination processing of S201. When the separated state of the heating section 20 and the gripping section 30 has been detected based on the detection result of the separation detector 52 (S202: YES), the counter 61A increments the count value of the coating removal event number by one (S203).

Namely, in the second embodiment, the counter 61A increments the count value of the coating removal event number by one (S203) when heating by the heater 211 has been detected based on the detection result of the heating detector 53 (S201: YES), and the separated state of the heating section 20 and the gripping section 30 has been detection based on the detection result of the separation detector 52 (S202: YES). At S201, the counter 61A may determine whether or not heating has been started, or may determine whether or not the heater 211 has reached a predetermined temperature based on the detection result of the temperature sensor.

In the second embodiment, not only is detection of the separated state of the heating section 20 and the gripping section 30 (S202) set, but also detection of heating by the heater 211 (S201) is set as a condition for incrementing the count value. Accordingly, the count value is not incremented when heating is not being performed in the heater 211, even if the separated state of the heating section 20 and the gripping section 30 is detected. This is because the heater 211 is in a heated state when the heating section 20 and the gripping section 30 are separated to remove the coating. By employing detection of heating by the heater 211 (S201) as a condition for incrementing the count value as in the second embodiment, the count value can be suppressed from increasing when the coating is not being removed, thereby enabling the count precision of the coating removal event number (the precision of matching between the coating removal event number and the count value) to be raised.

The processing of S104 to S106 in FIG. 9 is similar to that of the first embodiment, and so explanation thereof is omitted. As already explained, configuration may be made such that the next counting of the coating removal event number is permitted regardless of whether or not the open state of the heating-side lid 23 has been detected (S105). Moreover, when the count value has reached the predetermined value (S104: YES), the count value may simply be displayed on the display section instead of using the output section 71 for notification (S106). This point similarly applies to the following embodiments.

Third Embodiment

Figure 10:
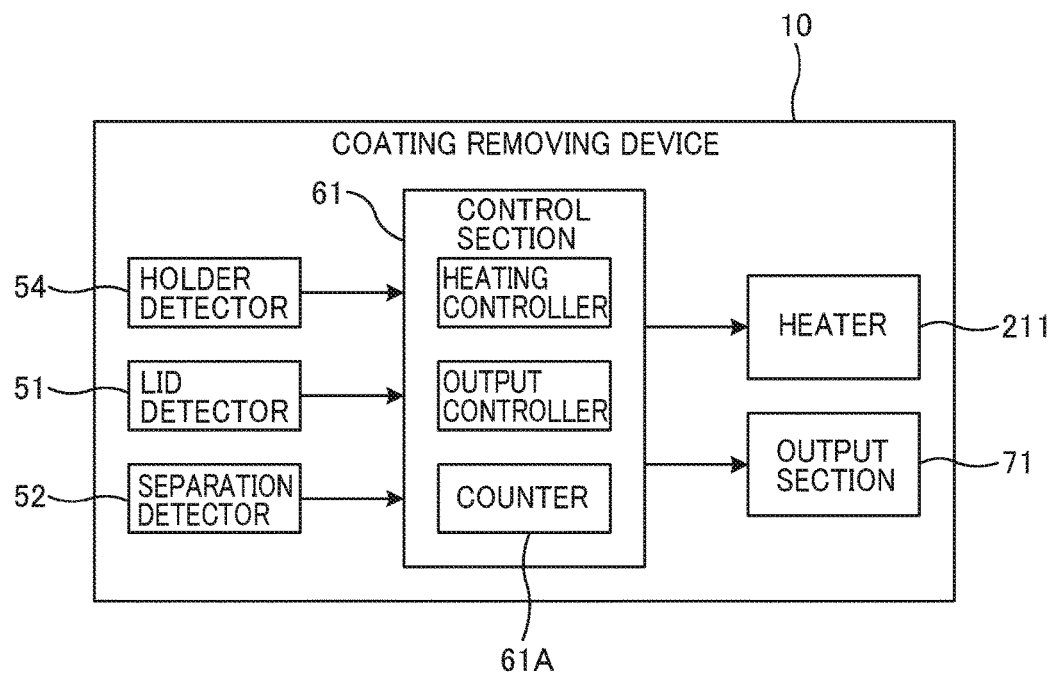
FIG. 10 is a block diagram illustrating a configuration of a coating removing device 10 of a third embodiment.

FIG. 10 is a block diagram illustrating a configuration of a coating removing device 10 of a third embodiment. The coating removing device 10 of the third embodiment includes a holder detector 54.

FIG. 11A and FIG. 11B are explanatory diagrams of the holder detector 54. FIG. 11A is an explanatory diagram illustrating a state prior to the holder detector 54 detecting the holder 7 (a pre-detection state). FIG. 11B is an explanatory diagram illustrating a state in which the holder detector 54 has detected the holder 7 (detection state).

The holder detector 54 is a member to detect the holder 7 housed in the holder housing part 311 of the gripping section 30. For example, the holder detector 54 is configured by a switch that is switched ON and OFF accordingly to mounting and demounting of the holder 7 to and from the holder housing part 311. However, the holder detector 54 may also be configured by a sensor (magnetic sensor, photosensor, or the like) that detects the holder 7 magnetically or optically.

Figure 12:
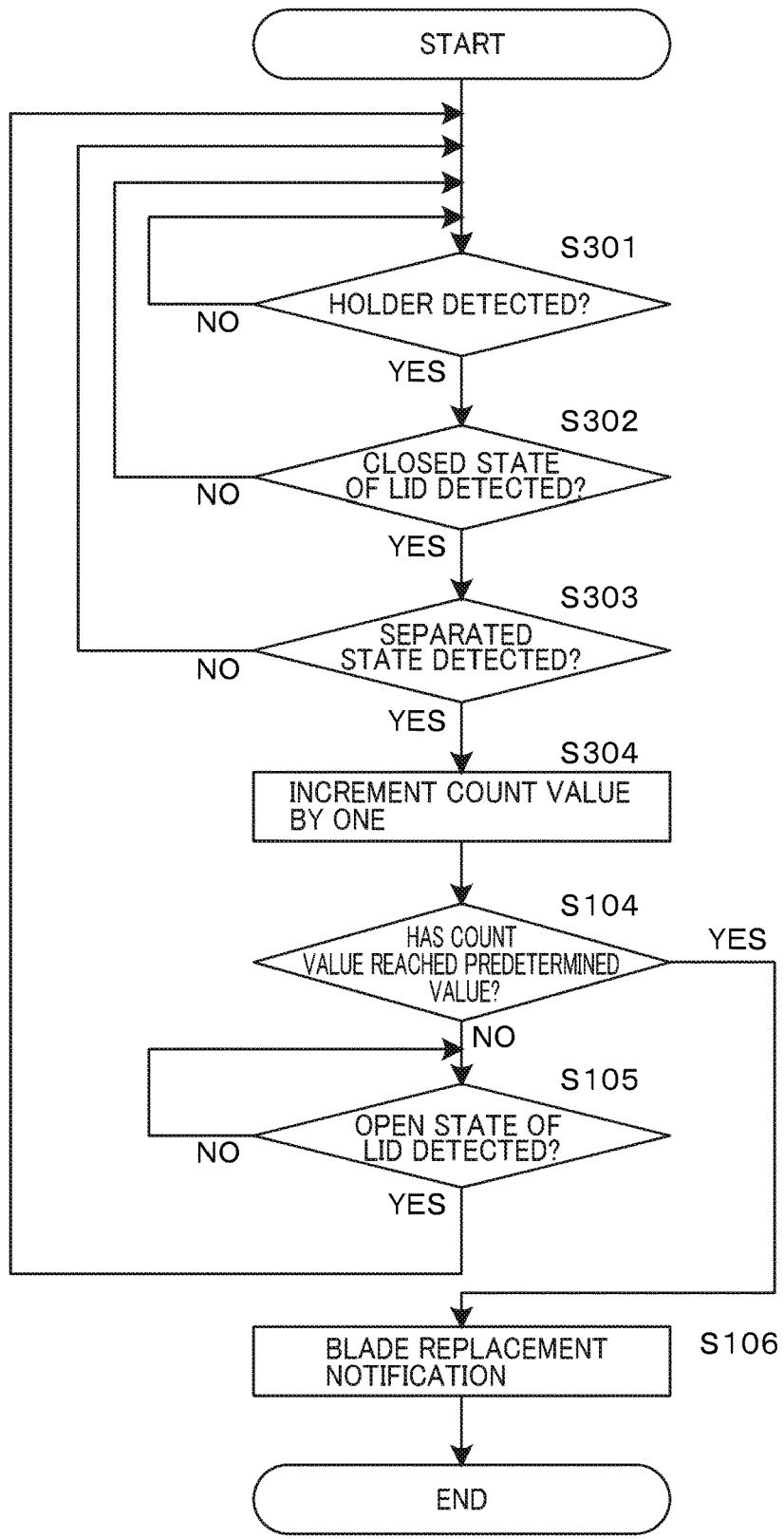
FIG. 12 is an explanatory diagram of processing to count the coating removal event number in the third embodiment.

FIG. 12 is an explanatory diagram of processing to count the coating removal event number in the third embodiment.

In the third embodiment, the counter 61A determines whether or not the holder 7 is being detected as housed in the holder housing part 311 based on the detection result of the holder detector 54 (S301). As long as the holder 7 is not being detected as being housed in the holder housing part 311 (S301: NO), the counter 61A repeats the determination processing of S301 until the holder is detected. When the holder 7 has been detected as being housed in the holder housing part 311 (S301: YES), the counter 61A then determines whether or not the closed state of the heating-side lid 23 has been detected based on the detection result of the lid detector 51 (S302). As long as the closed state of the heating-side lid 23 is not being detected (S302: NO) the counter 61A returns to the determination processing of S301. When the holder 7 has been detected as being housed in the holder housing part 311 based on the detection result of the holder detector 54 (S301: YES), and the closed state of the heating-side lid 23 has been detected based on the detection result of the lid detector 51 (S302: YES), the counter 61A determines whether or not the separated state of the heating section 20 and the gripping section 30 is being detected based on the detection result of the separation detector 52 (S303). As long as the separated state of the heating section 20 and the gripping section 30 is not being detected based on the detection result of the separation detector 52 (S303: NO), the counter 61A returns to the determination processing of S301. When the separated state of the heating section 20 and the gripping section 30 has been detected based on the detection result of the separation detector 52 (S303: YES), the counter 61A increments the count value of the coating removal event number by one (S304).

Namely, in the third embodiment, the counter 61A increments the count value of the coating removal event number by one (S304) when the holder 7 has been detected as being housed in the holder housing part 311 based on the detection result of the holder detector 54 (S301: YES), and the closed state of the heating-side lid 23 has been detected based on the detection result of the lid detector 51 (S302: YES), and the separated state of the heating section 20 and the gripping section 30 has been detected based on the detection result of the separation detector 52 (S303: YES).

In the third embodiment, not only are the detection of the closed state of the heating-side lid 23 (S302) and the detection of the separated state of the heating section 20 and the gripping section 30 (S303) employed, but detection of the holder 7 being housed in the holder housing part 311 (S301) is also employed as a condition for incrementing the count value. Accordingly, the count value is not incremented when the holder 7 is not housed in the holder housing part 311, even when the separated state of the heating section 20 and the gripping section 30 is detected with the heating-side lid 23 in the closed state. This thereby enables the count precision of the coating removal event number (the precision of matching between the coating removal event number and the count value) to be raised.

Note that detection of the closed state of the heating-side lid 23 (S302) may be removed from the conditions for incrementing the count value. In such cases, the counter 61A increments the count value of the coating removal event number by one (S304) when the holder 7 has been detected as being housed in the holder housing part 311 based on the detection result of the holder detector 54 (S301: YES), and the separated state of the heating section 20 and the gripping section 30 has been detected based on the detection result of the separation detector 52 (S303: YES). Adopting such a configuration still enables the count precision of the coating removal event number (the precision of matching between the coating removal event number and the count value) to be raised since it is possible to prevent the count value of the coating removal event number from being incremented when the holder 7 is not being housed in the holder housing part 311.

Fourth Embodiment

The separation detectors 52 illustrated in FIG. 5A to FIG. 5C are each disposed on an opposing face of the heating section 20 or the gripping section 30. However, the placement and configuration of the separation detector 52 are not limited thereto.

FIG. 13A is an explanatory diagram of a separation detector 52 of a fourth embodiment. The diagram at the top of FIG. 13A is an explanatory diagram illustrating a state (proximity state) prior to the separation detector 52 detecting separation of the heating section 20 and the gripping section 30. The diagram at the bottom of FIG. 13A is an explanatory diagram illustrating a state (separated state) in which the separation detector 52 has detected separation of the heating section 20 and the gripping section 30.

A shaft 41 in FIG. 13A, is a member that connects the heating section 20 and the gripping section 30 together, and that guides relative movement of the heating section 20 and the gripping section 30 (see also FIG. 2C). Note that one end (a rear end, the end portion on the left side 13A) of the shaft 41 is fixed to the gripping section 30, and the other end of the shaft 41 moves inside the heating section 20 when the gripping section 30 moves with respect to the heating section 20.

The separation detector 52 of the fourth embodiment detects separation of the heating section 20 and the gripping section 30 by detecting movement of the shaft 41 when the heating section 20 and the gripping section 30 are separated from each other. The separation detector 52 is configured here by a mechanical switch, and the switch (detection part) is dispose facing the heating section 20 side end portion (detected part) of the shaft 41. The separation detector 52 detects the separated state (or the proximity state) of the heating section 20 and the gripping section 30 due to the shaft 41 separating from the switch when the heating section 20 and the gripping section 30 are separated.

FIG. 13B is an explanatory diagram of a separation detector 52 of a modified example of the fourth embodiment. A gripping section 30 side end portion of the shaft 41 is fixed to the gripping section 30, and a flange portion 41B projecting out further toward the outside than a shaft portion 41A of the shaft 41 is formed to a heating section 20 side end portion of the shaft 41.

A switch (detection part) configuring the separation detector 52 is disposed at a position facing the shaft portion 41A of the shaft 41 when in the proximity state, and is disposed at a position facing the flange portion 41B (detected part) of the shaft 41 when a movement amount of the shaft 41 has reached a predetermined amount. The separation detector 52 is thus capable of detecting separation of the heating section 20 and the gripping section 30 due to the switch contacting the flange portion 41B and being switched ON or OFF when the movement amount of the shaft 41 has reached the predetermined amount. The counter 61A is thereby able to detect the separated state of the heating section 20 and the gripping section 30 based on the detection result of the separation detector 52 (see S102, S202, S303) when the heating section 20 and the gripping section 30 have separated from each other by a predetermined amount or greater. In other words, the count value of the coating removal event number is not incremented as long as the heating section 20 and the gripping section 30 are not separated by the predetermined amount or greater. This thereby enables the count precision of the coating removal event number (the precision of matching between the coating removal event number and the count value) to be raised.

In the foregoing explanation, the one end of the shaft 41 is fixed to the gripping section 30, and the switch (detection part) of the separation detector 52 is disposed in the heating section 20. However, the one end of the shaft 41 may be fixed to the gripping section 30 and a switch configuring the separation detector 52 disposed in the gripping section 30. Moreover, in the foregoing explanation, the separation detector 52 is configured using a switch; however, the separation detector 52 may be configured using a sensor (magnetic sensor, photosensor, or the like) that detects the holder 7 magnetically or optically.

Fifth Embodiment

In the embodiments described above, not only is detection of the separated state of the heating section 20 and the gripping section 30 employed, but also other conditions (for example S101, S105 etc.) are added as conditions for incrementing the count value of the coating removal event number. However, the count value of the coating removal event number may be incremented by one when the separated state of the heating section 20 and the gripping section 30 has been detected, without the addition of any other condition.

Figure 14:
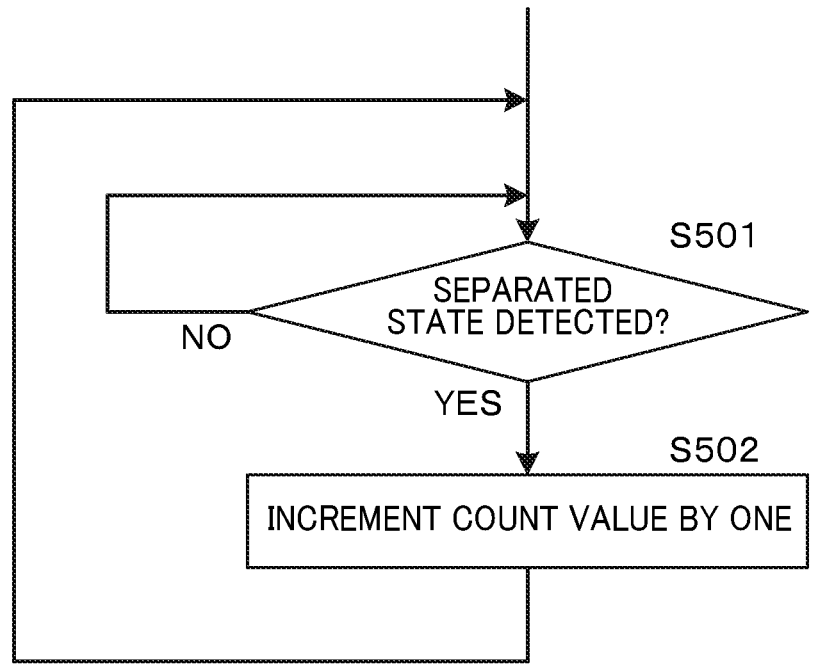
FIG. 14 is an explanatory diagram of processing to count the coating removal event number in a fifth embodiment.

FIG. 14 is an explanatory diagram illustrating processing to count the coating removal event number in a fifth embodiment.

In the fifth embodiment, the counter 61A increments the count value of the coating removal event number by one (S502) when the separated state of the heating section 20 and the gripping section 30 has been detected based on the detection result of the separation detector 52 (S501: YES). Merely performing this processing still enables the count value representing the coating removal event number to be increased by one when an operator has separated the heating section 20 and the gripping section 30 and removed the coating on the end portion of the optical fiber (see FIG. 2C).

Note that in cases in which the count value of the coating removal event number is incremented merely on detection of the separated state of the heating section 20 and the gripping section 30, in one embodiment, separation of the heating section 20 and the gripping section 30 is prevented when the coating is not being removed in order to suppress an increase in the count value when the coating is not being removed. Namely, the coating removing device 10, in one embodiment, includes a proximity-retention section 45 to maintain the heating section 20 and the gripping section 30 in a state in which they have been brought into proximity to each other.

Figure 15A:
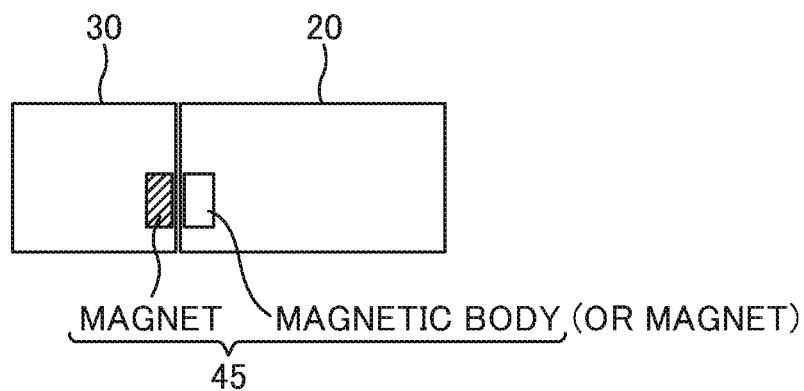
FIG. 15A and FIG. 15B are explanatory diagrams of examples of configurations of a proximity-retention section.
Figure 15B:
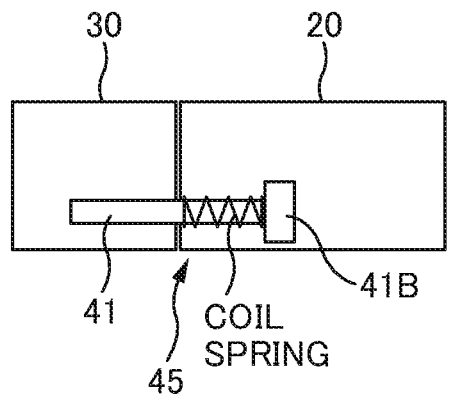

FIG. 15A and FIG. 15B are explanatory diagrams illustrating example configurations of the proximity-retention section 45.

The proximity-retention section 45 illustrated in FIG. 15A includes a magnet and a magnetic body. The magnet is disposed in the gripping section 30, and the magnetic body is disposed in the heating section 20, and magnetic force is used to maintain the heating section 20 and the gripping section 30 in the proximity state. Note that the magnet may be disposed in the heating section 20, and the magnetic body may be disposed in the gripping section 30. Alternatively, a magnet disposed in an attracting orientation may be disposed instead of the magnetic body.

In cases in which the proximity-retention section 45 includes a magnet, such as illustrated in FIG. 15A, the magnetic force of the magnet of the proximity-retention section 45 may be used to detect separation of the heating section 20 and the gripping section. Specifically, the magnetic sensor (separation detector 52) illustrated in FIG. 5B may be disposed so as to face the magnet (the magnet configuring the proximity-retention section 45) of the gripping section 30 in FIG. 15A. This thereby enables the magnet to be employed in both the separation detector 52 and the proximity retention section 45, enabling a reduction in the number of components.

The proximity-retention section 45 illustrated in FIG. 15B is configured by a coil spring. The coil spring is disposed in a compressed state between an inner wall face of the heating section 20 and the flange portion 41B of the shaft 41. Due to the coil spring being disposed in a pre-compressed state, the rebound force of the coil spring maintains the heating section 20 and the gripping section 30 in the state in which they have been brought into proximity to each other.

As described above, because the coating removing device 10 is provided with the proximity-retention section 45 that maintains the heating section 20 and the gripping section 30 in the state in which they have been brought into proximity to each other, separation of the heating section 20 and the gripping section 30 can be suppressed when the coating is not being removed. This thereby enables the count precision of the coating removal event number (the precision of matching between the coating removal event number and the count value) to be raised.

Others:

The foregoing embodiments are for facilitating the understanding of the present invention, and are not to be construed as to limit the present invention. Needless to say, the present invention may be modified and/or improved without departing from the gist thereof, and the present invention encompasses equivalents thereof. Accordingly, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber ribbon; 3: Optical fiber;
4: Bare optical fiber; 5: Coating;
7: Holder; 10: Coating removing device;
20: Heating section; 21: Heating-side body;
21a: Blade; 21b: Power switch; 211: Heater;
23: Heating-side lid;
23a: Blade; 23b: Projecting tab (detected part); 231: Retention part;
30: Gripping section; 31: Gripping-side body; 311: Holder housing part;
33: Gripping-side lid; 331: Holder retention part;
41: Shaft; 41a: Shaft portion; 41b: Flange portion;
45: Proximity-retention section;
51: Lid detector; 52: Separation detector;
53: Heating detector; 54: Holder detector;
61: Control section; 61a: Counter;
71: Output section; and 71a: Lamp (display section, notification section)

The invention claimed is:

1. A coating removing device comprising:
a heating section that includes:
   a heater that heats a coating of an optical fiber; and
   a blade that makes an incision in the coating of the optical fiber;
a gripping section that grips the optical fiber and moves with respect to the heating section;
a lid detector;
a separation detector; and
a counter that counts a coating removal event number when the lid detector detects a closed state of a lid of the heating section and the separation detector detects a separation between the heating section and the gripping section.

2. The coating removing device according to claim 1, wherein
after the counter has counted the coating removal event number, the counter permits next counting of the coating removal event number when an open state of the lid of the heating section is detected.

3. The coating removing device according to claim 1, further comprising:
a shaft that connects the heating section and the gripping section together and guides the separation between the heating section and the gripping section, wherein
the separation between the heating section and the gripping section is detected by detecting that a movement amount of the shaft has reached a predetermined amount when the heating section and the gripping section are separated.

4. The coating removing device according to claim 1, further comprising:
a proximity-retention section that maintains the heating section and the gripping section in a state in which the heating section and the gripping section are brought into proximity to each other.

5. The coating removing device according to claim 4, wherein:
the proximity-retention section uses magnetic force to maintain the heating section and the gripping section in the state in which the heating section and the gripping section are brought into proximity to each other; and the magnetic force of the proximity-retention section is used to detect the separation between the heating section and the gripping section.

6. The coating removing device according to claim 1, further comprising:
a notification section that notifies an operator that the coating removal event number has reached a predetermined value.

7. The coating removing device according to claim 1, further comprising:
a display section that displays the coating removal event number.

8. A coating removing device comprising:
a heating section that includes:
a heater that heats a coating of an optical fiber; and
a blade that makes an incision in the coating of the optical fiber;
a gripping section that grips the optical fiber and moves with respect to the heating section;
a heating detector;
a separation detector; and
a counter that counts a coating removal event number when the heating detector detects heating by the heater and the separation detector detects a separation between the heating section and the gripping section.

9. A coating removing device comprising:
a heating section that includes:
a heater that heats a coating of an optical fiber; and
a blade that makes an incision in the coating of the optical fiber;
a gripping section that grips the optical fiber and moves with respect to the heating section and that includes:
a holder that retains the optical fiber; and
a holder housing part that houses the holder;
a holder detector;
a separation detector; and
a counter that counts a coating removal event number when the holder detector detects the holder as being housed in the holder housing part and the separation detector detects a separation between the heating section and the gripping section.

* * * * *